United States Patent
Martinez (10) Patent No.: US 10,380,788 B2
(45) Date of Patent: Aug. 13, 2019

(54) FAST AND PRECISE OBJECT ALIGNMENT AND 3D SHAPE RECONSTRUCTION FROM A SINGLE 2D IMAGE

(71) Applicant: OHIO STATE INNOVATION FOUNDATION, Columbus, OH (US)

(72) Inventor: Aleix Martinez, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 133 days.

(21) Appl. No.: 15/782,433

(22) Filed: Oct. 12, 2017

(65) Prior Publication Data

US 2019/0114824 A1    Apr. 18, 2019

(51) Int. Cl.

| | |
|---|---|
| G06K 9/62 | (2006.01) |
| G06T 15/20 | (2011.01) |
| G06K 9/00 | (2006.01) |
| G06T 3/40 | (2006.01) |
| G06T 7/55 | (2017.01) |
| G06N 3/08 | (2006.01) |

(52) U.S. Cl.
CPC ........ *G06T 15/205* (2013.01); *G06K 9/00281* (2013.01); *G06N 3/08* (2013.01); *G06T 3/4046* (2013.01); *G06T 7/55* (2017.01)

(58) Field of Classification Search
CPC ....... G06T 15/205; G06T 3/4046; G06T 7/55; G06K 9/00281; G06N 3/08

USPC ......................................................... 382/157
See application file for complete search history.

(56) References Cited

PUBLICATIONS

Fan, Haoqiang, Hao Su, and Leonidas Guibas. "A Point Set Generation Network for 3D Object Reconstruction from a Single Image." arXiv preprint arXiv:1612.00603 (2016).*

Choy, Christopher B., Danfei Xu, JunYoung Gwak, and Kevin Chen Silvio Savarese. "3D-R2N2: A Unified Approach for Single and Multi-view 3D Object Reconstruction." arXiv preprint arXiv:1604.00449 (2016).*

* cited by examiner

*Primary Examiner* — Andrew M Moyer
(74) *Attorney, Agent, or Firm* — Walter Haverfield LLP; James J. Pingor (57) ABSTRACT

The innovation describes and discloses systems and methods related to deep neural networks employing machine learning to detect item 2D landmark points from a single image, such as those of an image of a face, and to estimate their 3D coordinates and shape rapidly and accurately. The system also provides for mapping by a feed-forward neural network that defines two criteria, one to learn to detect important shape landmark points on the image and another to recover their depth information. An aspect of the innovation may utilize camera models in a data augmentation approach that aids machine learning of a complex, non-linear mapping function. Other augmentation approaches are also considered.

22 Claims, 9 Drawing Sheets

FAST AND PRECISE OBJECT ALIGNMENT AND 3D SHAPE RECONSTRUCTION FROM A SINGLE 2D IMAGE

GOVERNMENT LICENSE RIGHTS

This invention was made with government support under Grant Nos. R01-EY-020834 and R01-DC-014498, awarded by the National Institutes of Health. The government has certain rights in the invention.

ORIGIN

The innovation disclosed herein relates to a system and related methods for reconstruction of a 3D shape of a face or other object(s) from a single 2D image.

OVERVIEW

The innovation relates to work in at least the following areas for precise and detailed detections: computer vision, machine learning, artificial intelligence, affect computing, face recognition, 3D modeling and reconstruction of faces and other objects, machine-generated 3D shape from a single 2D image.

Three-dimensional (3D) reconstruction from a single face or other item image using computer vision algorithms can be roughly divided into at least two approaches: dense 3D estimation using synthesis and 3D landmark estimation.

With respect to dense 3D estimation using synthesis for face or other item modeling, the main challenge is locating a dense set of corresponding features in a variety of images. This particular approach tends to be computationally expensive and the inherent model complexity typically yields subpar alignments and reconstructions.

An alternative approach is 3D landmark estimation, in which an image is used to infer a set of points describing the contour of a set of item features, for example, facial features such as eyes, eyebrows, nose, mouth, etc. The present innovation is related to the alternative approach. Contrasting the present disclosed innovation with other attempts at 3D landmark estimation, for example Tulyakov and Sebe, in an article "Regressing a 3d face shape from a single image" from The International Conference on Computer Vision (ICCV) (2015), the other attempt teaches that a two-step approach is not to be followed as being generally computationally expensive. Instead, Tulyakov and Sebe teach a direct 3D landmark detection approach of using tree-based regressors to improve estimates of a 3D shape of a face from an initial set of 3D landmark points. However, the current disclosed innovation circumvents the limitation of being too computationally expensive. Aspects of the innovation demonstrate that the step of upgrading from 2D to 3D landmark points can be computationally efficient (running at greater than one thousand images per second) and can yield better accuracies than previous methods described before.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Computerized applications that are enabled with the present innovation may be applied to many applications of 2D to 3D reconstructions, for example, many machine face recognition applications may desire a precise 3D reconstruction of the shape of a face or other objects, even when only a single 2D image is available. The innovation can be embodied in an application of a novel regression approach that employs machine learning to detect facial or other item landmark points from a single image and to estimate their 3D shape rapidly and accurately. The innovation regresses and applies a function $f(\cdot)$ that maps 2D images of faces to a corresponding 3D shape. The innovation uses a deep neural network to model the non-linearity mapping function, and demonstrates how the function may be efficiently trained using a variety of number of samples (sample face images under varying pose, illumination, identity and expression).

The innovation enables mapping with a feed-forward neural network that defines two criteria, one that learns to detect important shape landmark points on an image and another that recovers their depth information. The innovation also utilizes camera models in a data augmentation approach that aids machine learning of a complex, non-linear mapping function. Aspects of the innovation of derived deep architecture and optimization criteria have demonstrated efficient learning using a large number of samples and testing runs at greater than thirty frames per second on an i7 desktop.

DETAILED DESCRIPTION

In the following description, for purposes of explanation, numerous specific details are set forth in order to provide a thorough understanding of the subject innovation. It may be evident, however, that the innovation can be practiced without these specific details. In other instances, well-known structures and devices are shown and/or described in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

Figure 1:
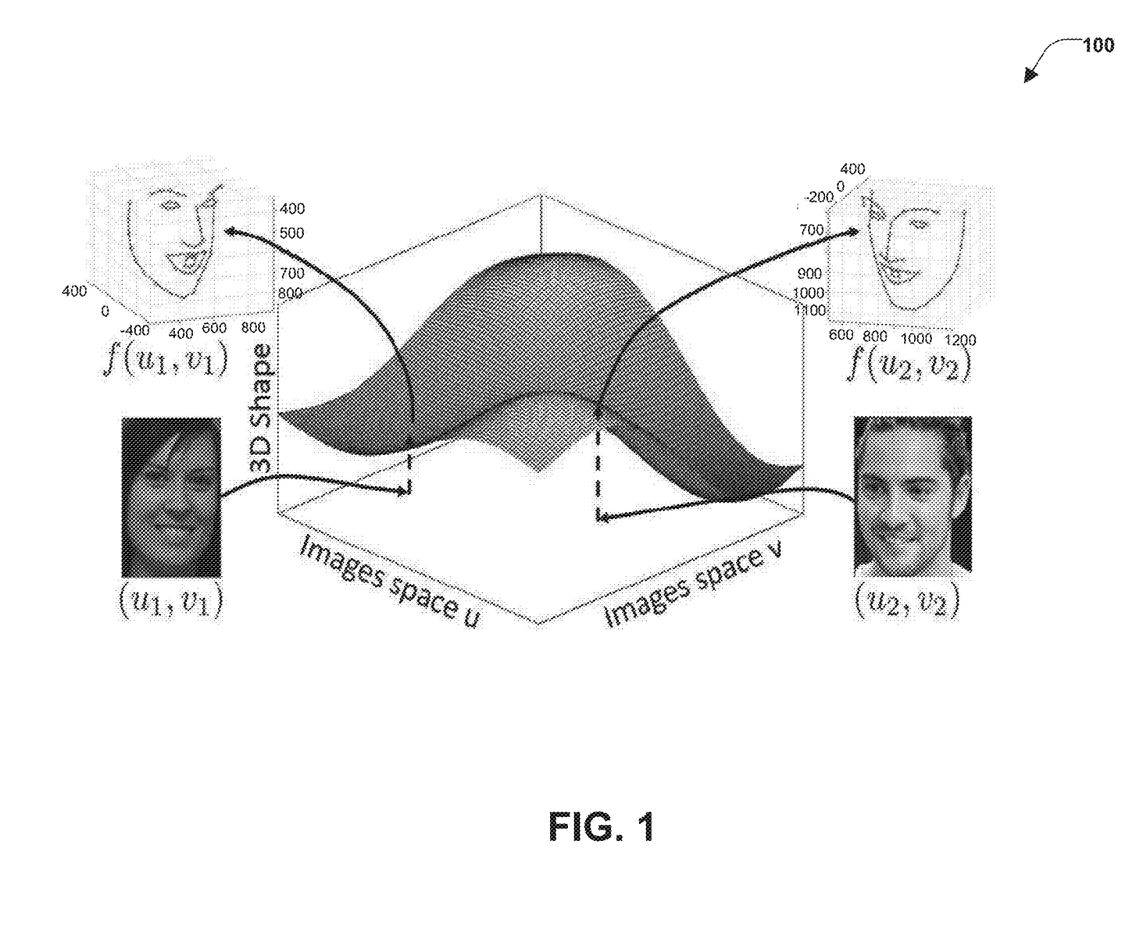
FIG. 1 illustrates a conceptual portrayal of an approach of the innovation.

FIG. 1 illustrates a conceptual illustration of an approach of the innovation. The u and v axes correspond to an image space (pixel values), for example, a face image, while the z axis corresponds to the 3D shape of the image. A finite set of face image samples and their associated 2D shape landmarks may be used to estimate the parameters of a deep neural network that define a mapping $f(\cdot)$ from an image to its associated 3D shape.

Figure 2:
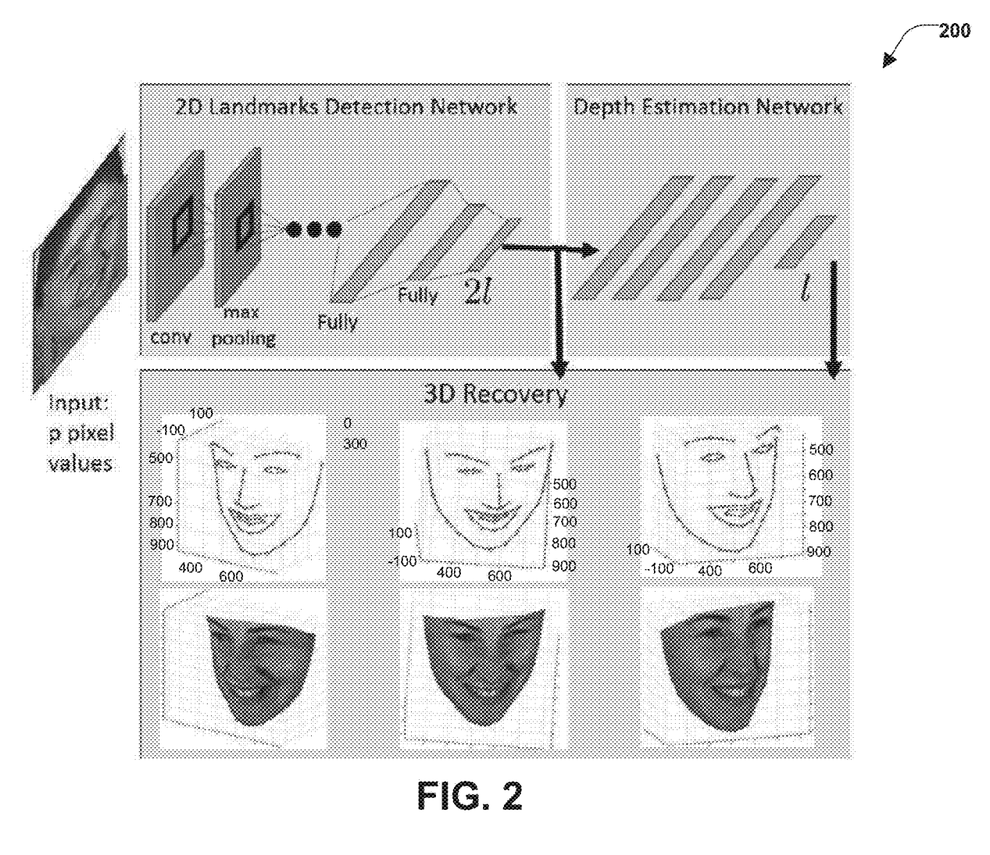
FIG. 2 illustrates an example embodiment of a network architecture in accordance with an aspect of the innovation.

The innovation applies a novel algorithm that provides a fast and precise estimation of the 3D shape of an item, for example, a face, from a single 2D image of the item. As illustrated in FIG. 1, an aspect of the innovative approach is to define a mapping function $f(\cdot)$ that identifies the 3D shape of a face from image attributes, for example, the shading patterns observable in a 2D image. As indicated in FIG. 2, given an image $a \in \mathbb{R}^p$ (p the number of pixels), with a deep neural network defining a function $s=f(a)$ may yield the 3D coordinates of the l landmark points defining the shape of the face, $s \in \mathbb{R}^{3l}$. As should be appreciated, given the large number of possible identities, illuminations, poses and expressions, a particular functional mapping $f(\cdot)$ may be difficult to estimate, and the innovation resolves this problem using a deep neural network. A deep neural network is a regression approach to estimate non-linear mappings of the form $s=f(a)$, where a is the input and s is the output. A deep neural network may have p input and 3l output nodes. Complex 2D image to 3D shape mapping may be learned with a number of hidden layers and non-linear functions between layers of a deep neural network. It is to be appreciated that the term "learn" and its derivatives signify the application of machine learning techniques as the innovation is directed to machine processing of images. This innovation is in sharp contrast to linear regression methods attempted previously as well as non-linear attempts to model 2D shape from a single image or 3D shape from multiple images.

Further, compared to previous approaches, an innovative approach of the deep neural network is also able to learn from a variety of number of 3D sample shapes, from small to large numbers of shapes. A small number of samples might not seem sufficient for learning a regressor, but the innovative approach of the deep neural network may also comprise data augmentation methods that circumvent a problem of otherwise too limited sample size. For example, an embodiment of an innovative augmentation may use a camera model to generate multiple views of the same 3D shape and the matching 2D landmark point on the original sample image. Successfully and accurately recovering 3D shape of faces from a single view has been demonstrated. Further, a deep neural network derived with multi-layers can be trained very quickly and testing runs faster than real-time (greater than thirty frames per second).

In another embodiment, deep neural networks enable modeling of complex, non-linear functions from large numbers of samples. Samples may include 2D images of faces $a_i$, $i=1, \ldots, n$, and $n=n_1+n_2$, with the first $n_1$ images with their corresponding 2D and 3D shapes, $s_i$, and the second $n_2$ images with just 2D shapes.

FIG. 2 illustrates an example embodiment of a network architecture in accordance with an aspect of the innovation. As can be seen in this figure, an image of an item may provide p entry nodes, representing the p image pixels of an item (for example, an image of a face), and 3l output nodes, defining the 3D shape of the face. To facilitate the learning of the function $f(\cdot)$, the entry p nodes must only define the face and, hence, the entry and output nodes are to be aligned. To this end, in this embodiment, use of most any conventional bounding box face detector, for example the bounding box face detector of that of Viola and Jones, discussed in the article "Rapid object detection using a boosted cascade of simple features" in IEEE Computer Society Conference on Computer Vision and Pattern Recognition (CVPR). (2001), to detect the approximate location of the face is contemplated. In some embodiments, this bounding box can be used to resize the face image to have p pixels.

Next, for an embodiment of a deep neural network, optimization criteria is defined. For the proposed approach, two optimization criteria are defined. First, a criterion for accurate detection of 2D landmark points on an aligned image is derived. Second, a criterion for converting these 2D landmark points to 3D is defined. These two criteria are illustrated in FIG. 2 in an example of a deep neural network with network elements of 2D Landmark Detection Network and Depth Estimation Network for a face image. In some embodiments, the first criterion may be used to optimize the parameters of the first several layers of a deep neural network, while the second criterion may optimize parameters of one or more latter layers. To achieve accurate landmark detections and 3D reconstructions, gradient descent may be used. Gradient descent optimizes the parameters of the network until the second criterion (i.e., the 3D shape reconstruction) is as accurate as possible. In other embodiments, alternative optimization algorithms may be used. Discussions of the derivations of these two criteria for the detection of the 2D fiducial points and their 3D reconstruction and defining the details of the architecture of the proposed deep neural network follow.

FIG. 2 presents an example embodiment with a face image being detected using a conventional face detector as input. The first layers of a deep neural network detect 2D coordinates of l landmarks, the x and y coordinates of the landmark points. Latter layers of the deep neural network then add the depth information to these 2D landmark points, the z values. Once the deep neural network processes the nonlinear mapping, a 3D reconstruction of the face may be provided.

An example deep neural network for the detection of facial landmark points according to aspects of the innovation may provide a deep convolutional networking defined with p input nodes, 2l output nodes and 6 layers (as shown in FIG. 2, for example). A deep neural network may be multi-layered. Multiple layers may be a combination of convolutional layers and connected layers. For example, the embodiment being discussed from FIG. 2 includes four convolutional layers and two fully-connected layers.

Turning next to the second criterion of optimization, a deep neural network may employ machine learning to detect 2D landmark points of an input image accurately. In an embodiment, image samples and their corresponding 2D output variable (i.e., 2D landmark points) may be defined as the set $\{(a_i; o_i) \ldots, (a_n; o_n)\}$, where $o_i$ is the true (desirable) location of the 2D landmark points of the face. Note that $o_i$ is a vector of 2l image coordinates, $o_i = (u i_j, v i_j, \ldots, u_{il}, v_{il})^T$, where $(u_{ij}, v_{ij})^T$ is the $j^{th}$ landmark point.

As a goal of a computer vision system is to identify the vector of mapping functions $f(a_i, w) = (f_j(a_i, w_j), \ldots, f_l(a_i, w_l))^T$ that converts an input image $a_i$ to an output vector $o_i$ of detections, with $w = (w_j, \ldots, w_l)^T$ as a vector of parameters of the mapping functions. Hence, $f_j(a_i, w_j) = (\hat{u}_{ij}, \hat{v}_{ij})^T$ are the estimates of the 2D image coordinates $u_{ij}$ and $v_{ij}$, and $w_j$ and are the parameters of the function $f_j$.

For a fixed mapping function f($a_i$, w) (e.g., as may be used in a convolutional neural network), a goal of optimizing w may be formally stated:

$$\mathcal{J}(\tilde{w}) = \min_{w} \mathcal{L}_{local}(f(a_i, w), o_i), \quad (1)$$

where $\mathcal{L}_{local}(\cdot)$ denotes a loss function. Specifically, we use the $L^2$-loss defined as, $$\mathcal{L}_{local}(f(a_i, w), o_i) = l^{-1} \sum_{j=1}^{l} (f_j(a_i, w_j) - o_{ij})^2, \quad (2)$$

where $o_{ij}$ is the $j^{th}$ element of $o_i$, i.e., $o_{ij} \in \mathbb{R}^2$.

Without loss of generality, and to simplify notation, the innovative approach uses $f_i$ in lieu of $f(a_i, w)$ and $f_{ij}$ instead of $f_j(a_i, w_j)$. Note that the functions $f_{ij}$ are the same for all i, but may be different for distinct values of j.

The above derivations correspond to a local fit. That is, (1) and (2) attempt to optimize the fit of each one of the outputs independently and then take the average fit over all outputs. This approach has several solutions, even for a fixed fitting error. For example, the error can be equally distributed across all outputs $\|f_{ij} - o_{ij}\|_2 \approx \|f_{ik} - o_{ik}\|_2$, $\forall j,k$, where $\|\cdot\|_2$ is the 2-norm of a vector. Or, most of the error may be in one (or a few) of the estimates: $\|f_{ij} - o_{ij}\|_2 \gg \|f_{ik} - o_{ik}\|_2$ and $\|f_{ik} - o_{ik}\|_2 \approx 0$, $\forall k \neq j$. In general, for a fixed fitting error, the latter example is less preferable, because it leads to large errors in one of the output variables. Large errors may indicate that an algorithm did not converge as expected, and its results may be less useful.

A possible solution to this problem is to add an additional constraint to minimize $$\frac{2}{r(r+1)} \sum_{1 \leq j < k \leq r} |(f_{ij} - o_{ij}) - (f_{ik} - o_{ik})|^c, \quad (3)$$

with $c \geq 1$. However, this approach typically results in very slow training, limiting the amount of training data that can be efficiently used. By reducing the number of training samples, generalization to unseen samples worsens, resulting typically in less accurate detections. Another typical problem of this equation is that the constraint is not flexible enough for current optimization algorithms. The innovative approach resolves these problems by adding a global fitting criterion that instead of slowing or halting desirable convergences, it speeds them up.

An aspect of the innovative approach is to note that the constraint in (2) is local because it measures the fit of each element of $o_i$ (i.e., $o_{ij}$) independently. By local, it is to be appreciated that only that one local result is aimed for. The same criterion can nonetheless be used differently to measure the fit of pairs of points; formally:

$$\mathcal{L}_{pairs}(f_i, o_i) = \frac{2}{l(l+1)} \sum_{1 \leq j < k \leq l} (g(f_{ij}, f_{ik}) - g(o_{ij}, o_{ik}))^2, \quad (4)$$

where $g(d, e) = \|d - e\|_b$ is the b-norm of d−e (e.g., the 2-norm, $g(d, e) = \sqrt{((d-e)^T(d-e))}$).

An aspect of the innovative approach for these derivations is the realization that (4) is no longer local, since it takes into account the global structure of each pair of elements. Resolving the problems of (2) enumerated above with the addition of (4) yields accurate detections of landmark points and fast training.

In some embodiments of a deep neural network, layers may be h($f_{ij}$)=$f_{ij}$ in $\mathbb{R}^2$ for landmark detection. In other embodiments, a global criterion may be extended to triplets; formally:

$$\mathcal{L}_{trip}(f_i, y_i) = \binom{r}{3}^{-1} \sum_{1 \leq j < k < s \leq r} [g(h(f_{ij}), h(f_{ik}), h(f_{is})) - g(y_{ij}, y_{ik}, y_{is})]^2.$$

Here g(x, z, u) is a function that computes the similarity between its three entries. Applying the function in detection of landmark points, this means a norm can be computed as above, e.g., $g(x, z, u) = \|(x-z)+(z-u)\|_b$, but also the area of a triangle defined by each triplet of landmark points can be calculated; formally, $g(x, z, u) = \frac{1}{2}|(x-z) \times (x-u)|$, where we assume the three landmark points are non-co-linear.

In still other embodiments, global criterion may be extended to four and more points. For instance, as applied to convex quadrilaterals as $g(x, z, u, v) = \frac{1}{2}|(x-u) \times (z-v)|$. In such embodiments, for t landmark points, the area of the polygon envelope can be computed, i.e., a non-self-intersecting polygon contained by the t landmark points $\{x_{i1}, \ldots, x_{it}\}$. This polygon may be computed as follows. First, a Delaunay triangulation of image (for example a face image) landmark points is computed. A polygon envelop is easily obtained by connecting the lines of the set of t landmark points in counter-clockwise order. Denoting this ordered set of landmark points $\tilde{x}_i = \{\tilde{x}_{i1}, \ldots, \tilde{x}_{it}\}$, the area is then given by:

$$g_a(\tilde{x}_i) = \frac{1}{2}\left[\left(\sum_{k=1}^{t-1} (\tilde{x}_{ik1}\tilde{x}_{i(k+1)2} - \tilde{x}_{ik2}\tilde{x}_{i(k+1)1})\right) + (\tilde{x}_{it1}\tilde{x}_{i12} - \tilde{x}_{i12}\tilde{x}_{it1})\right],$$

where we used the subscript a to denote "area" and $\tilde{x}_{ik} = (\tilde{x}_{ik1}, \tilde{x}_{ik2})^T$.

In some embodiments, we may use the combined local and global loss function functions given by, $\mathcal{L}(f_i, y_i) = \alpha_0 \mathcal{L}_{local}(f_i, y_i) + \mathcal{L}_{global}(f_i, y_i)$, with the global loss defined as $\mathcal{L}_{global}(f_i, y_i) =$ $$\sum_{t=1}^{t_{max}} \alpha_t [g(h(\tilde{f}_{ij}), \ldots, h(\tilde{f}_{it})) - g(\tilde{y}_{ij}, \ldots, \tilde{y}_{it})].$$

In an example implementation that demonstrates aspects of the innovation, l was set to 66 and $n_1 + n_2 = 18,600$ samples were used. Additionally, the deep neural network used four convolutional layers, two max pooling layers and two fully connected layers. It is to be appreciated that normalization may be applied, with dropout, and rectified linear units (ReLU) at the end of each convolutional layer. An advantage of the embodiment is that learning from even very large datasets can be efficiently performed. In order to have a landmark detector invariant to any affine transformation and partial occlusions, a data augmentation approach may be used (as will also be discussed in relation to section "Missing Data" herein). Specifically, an additional 80,000 images were generated by applying two-dimensional affine transformations to an existing training set, i.e., scale, reflection, translation and rotation; scale was between 2 and 0.5, rotation was −10° to 10°, and translation and reflection were randomly generated. This is equivalent to using a camera model. In order to make the network more robust to partial occlusions, random occluding boxes of d×d pixels may be added, and in an example embodiment of an item being a face, d may be set between 0.2 and 0.4 times an inter-eye distance; in the example embodiment, 25% of training images had partial occlusions.

Picking back up on a discussion of the second criterion, the recovery of 3D information (i.e., the depth value) related to 2D landmark points (as detected above, for example) is described. Note that the n 2D landmark points on the $i^{th}$ image in matrix form can be written as $$U_i = \begin{pmatrix} u_{i1} & u_{i2} & \cdots & u_{in} \\ v_{i1} & v_{i2} & \cdots & v_{in} \end{pmatrix} \in \mathbb{R}^{2 \times n}. \quad (5)$$

in order to recover the 3D coordinates of these 2D landmark points, $$S_i = \begin{pmatrix} x_{i1} & x_{i2} & \cdots & x_{in} \\ y_{i1} & y_{i2} & \cdots & y_{in} \\ z_{i1} & z_{i2} & \cdots & z_{in} \end{pmatrix} \in \mathbb{R}^{3 \times n}, \quad (6)$$

where $(x_{ij}, y_{ij}, z_{ij})^T$ are the 3D coordinates of the $j^{th}$ face landmark.

With an embodiment using a weak-perspective camera model, with calibrated camera matrix $$M = \begin{pmatrix} \lambda & 0 & 0 \\ 0 & \lambda & 0 \end{pmatrix},$$

the weak-perspective projection of the face 3D landmark points may be given by $$U_i = MS_i. \quad (7)$$

This result is defined up to scale, since $u_i = \lambda x_i$ and $v_i = \lambda y_i$, where
$x_i^T = (x_{i1}, x_{i2}, \ldots, x_{in})$, $y_i^T = (y_{i1}, y_{i2}, \ldots, y_{in})$, $z_i^T = (z_{i1}, z_{i2}, \ldots, z_{in})$, $u_i^T = (u_{i1}, u_{i2}, \ldots, u_{in})$ and $V_i^T = (v_{i1}, v_{i2}, \ldots, v_{in})$.

It is to be appreciated that this approach requires that variables are to be standardized when deriving the algorithm.

Continuing with the description of the embodiment of a proposed neural network, it is to be noted that given a training set with n 3D landmark points $\{S_i\}^n_{i=1}$, the aim is to learn the function $f: \mathbb{R}^{2n} \to \mathbb{R}^{3n}$, that is, $$\hat{z}_i = f(\hat{x}_i, \hat{y}_i), \quad (8)$$

where $\hat{x}_i$, $\hat{y}_i$, and $\hat{z}_i$, are obtained by standardizing $x_i$, $y_i$ and $z_i$ as follows, $$\hat{x}_{ij} = \frac{x_{ij} - \bar{x}_i}{(\sigma(x_i) + \sigma(y_i))/2}, \quad (9)$$

-continued $$\hat{y}_{ij} = \frac{y_{ij} - \bar{y}_i}{(\sigma(x_i) + \sigma(y_i))/2},$$

$$\hat{z}_{ij} = \frac{z_{ij} - \bar{z}_i}{(\sigma(x_i) + \sigma(y_i))/2},$$

where $\bar{x}_i$, $\bar{y}_i$ and $\bar{z}_i$ are mean values, and $\sigma(x_i)$, $\sigma(y_i)$ and $\sigma(z_i)$ are the standard deviation of the elements in $x_i$, $y_i$ and $z_i$ respectively.

It is to be appreciated that $x_i$, $y_i$ and $z_i$ are standardized to eliminate the effect of scaling and translation of the 3D face, as noted above. In this manner, the embodied deep neural network models the function $f(\cdot)$ using multi-layers. As discussed previously in regards to FIG. 2, an overall architecture of an embodied deep neural network may be depicted, containing M layers. The $m^{th}$ layer may be defined by:

$$a^{(m+1)} = \tan h(\Omega^{(m)} a^{(m)} + b^{(m)}),$$

where $a^{(m)} \in \mathbb{R}^d$ is an input vector, $a^{(m+1)} \in \mathbb{R}^r$ is the output vector, d and r specify the number of input and output nodes, respectively, and $\Omega \in \mathbb{R}^{r \times d}$ and $b \in \mathbb{R}^r$ are network parameters, with the former a weighting matrix and the latter a basis vector. An embodiment of the deep neural network may use a Hyperbolic Tangent function, tan h($\cdot$).

Deep neural network model parameter optimization includes an objective to minimize the sum of the Euclidean distances between the predicted depth location $a_i^{(m)}$ and the ground-truth $\hat{z}_i$, of our l 3D landmark points, formally:

$$\min \sum_{i=1}^{l} \|\hat{z}_i - a_i^{(m)}\|_2,$$

with $\|\cdot\|_2$ the Euclidean distance of two vectors. The RMSProp algorithm, as discussed in Tieleman and Hinton's "Lecture 6.5-rmsprop: Divide the gradient by a running average of its recent magnitude" in COURSERA: Neural Networks for Machine Learning (2012), which is incorporated by reference herein in its entirety, may be utilized to optimize model parameters. In other embodiments, alternative optimization algorithms may be used. In a multi-layer neural network, an appropriate learning rate may vary widely between learning (training) as well as between different parameters. RMSProp is a technique that updates parameters of a neural network to improve learning, and can adaptively adjust a learning rate of each parameter separately to improve convergence to a solution.

It is to be appreciated that implementation details of an embodiment of a deep neural network may contain six or more layers in a feed-forward embodiment. The number of nodes may be 2n in each layer except the last one wherein the number of nodes is n. In other embodiments, the number of nodes may be different in each layer, but will generally be n in the last layer since this is the number of landmark points to be reconstructed in 3D. In other embodiments, the number of layers may be 4 or more.

When testing on the $t^{th}$ face, we have $u_t$ and $v_t$, and want to estimate $x_t$, $y_t$ and $z_t$. From Eq. (7) we have $u_t = \lambda x_t$ and $v_t = \lambda y_t$.

Thus, we first standardize the data, $$\hat{u}_{tj} = \frac{u_{tj} - \bar{u}_t}{(\sigma(u_t) + \sigma(v_t))/2}, \quad (12)$$

$$\hat{v}_{ij} = \frac{v_{ij} - \bar{v}_t}{(\sigma(u_t) + \sigma(v_t))/2}.$$

This yields $\hat{x}_t = \hat{u}_t$ and $\hat{y}_t = \hat{v}_t$. Therefore, we can directly feed $(\hat{u}_t, \hat{v}_t)$ into a trained neural network to obtain its depth $\hat{z}_t$. Then, the 3D shape of an image, for example, a face, can be recovered as $(\hat{u}_t^T, \hat{v}_t^T, \hat{z}_t^T)^T$, a result that is defined up to scale.

Training data may be divided into a training set and a validation set. In each of these two sets, data augmentation may be performed. Generally, augmentation may include algorithm treatment for noise in data, or missing data, as well as handling a variable number of training samples. Specifically, weak-perspective camera models defined above may be used to generate new 2D views of the 3D landmark points given in the training set. This process may help the deep neural network's applied algorithms learn how each 3D shape is seen from a large variety of 2D views (translation, rotation, scale). Early stopping may be enabled to prevent overfitting and accelerate the training process. For example, training process may be stopped if the validation error does not decrease after 10 iterations. A learning rate may be set, for example at 0.01.

"Missing Data"

To aid in solving a problem of missing data, an embodiment of a deep neural network may add a recurrent layer on top of a previous multi-layer neural network to jointly estimate both the 2D coordinates of missing 2D landmarks and their depth. The complete network may be trained in an end-to-end fashion.

Figure 3:
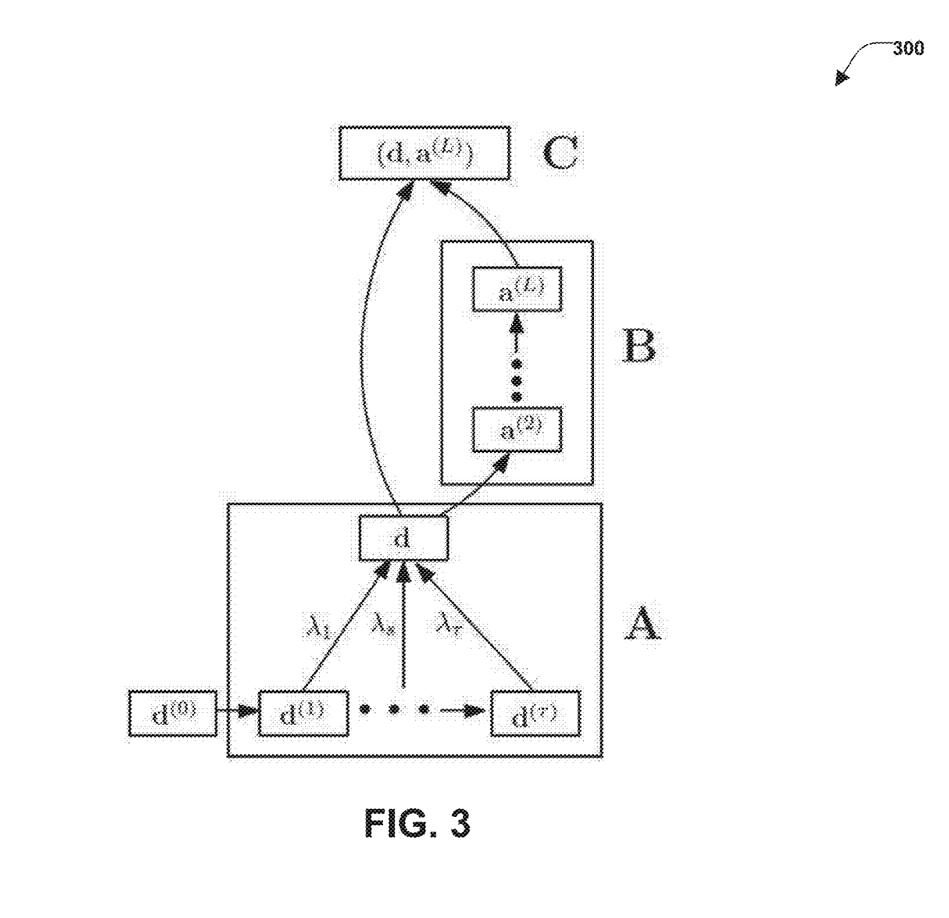
FIG. 3 illustrates an augmentation application in accordance with an aspect of the innovation.

Turning now to FIG. 3, module "A" corresponds to a recurrent layer that estimates the 2D entries of missing data, while "B" may be an embodiment of a multi-layer neural network, for example, as described previously. In FIG. 3 $d^{(0)}$ is the input to the deep neural network. "A" is a recurrent layer with T steps for estimating missing inputs. "B" is a prior described multi-layer deep neural network. "C" combines the results of "A" and "B" to yield the final output of the augmented deep neural network. In other words, the output of "A" is thus the full set of 2D landmarks and the output of "B" their corresponding depth values. The module "C" merges the outputs of "A" and "B" to generate the final output, $(\hat{u}_i^T, \hat{v}_i^T, \hat{z}_i^T)^T$ and $\ell_2$ is the loss function used.

In the recurrent layer, we use the notation $\hat{u}_{ij}^{(s)}$ and $\hat{v}_{ij}^{(s)}$ to specify the estimated values of $\hat{u}_{ij}$ and $\hat{v}_{ij}$ at iteration s. Here, i specifies the $i^{th}$ sample. The input to our above embodied deep neural network can then be written as $d_i^{(0)} = (\hat{u}_{i1}^{(0)}, \hat{v}_{i1}^{(0)}, \ldots, \hat{u}_{in}^{(0)}, \hat{v}_{in}^{(0)})$, with s=0 specifying the initial input. If the values of $u_{ij}$ and $v_{ij}$ are missing, then $\hat{u}_{ij}^{(0)}$ and $\hat{v}_{ij}^{(0)}$ are set to zero. Otherwise the values of $u_{ij}$ and $v_{ij}$ are standardized using Eq. (12) to obtain $\hat{u}_{ij}^{(0)}$ and $\hat{v}_{ij}^{(0)}$.

In subsequent iterations, from s−1 to s, if the $j^{th}$ landmark is not missing, $\hat{u}_{ij}^{(s)} = \hat{u}_{ij}^{(s-1)}$ and $\hat{v}_{ij}^{(s)} = \hat{v}_{ij}^{(s-1)}$. If the $j^{th}$ landmark is missing, then $\hat{u}_{ij}^{(s)} = g(\Sigma_{k=1}^{2n} w_{k(2j-1)} d_{ik}^{(s-1)})$, $\hat{v}_{ij}^{(s)} = g(\Sigma_{k=1}^{2n} w_{k(2j)} d_{ik}^{(s-1)})$, where $g(\cdot)$ can be the identity (linear) function or a nonlinear function (e.g. tan $h(\cdot)$) and $w_{k(2j-1)}$, $w_{k(2j)}$, k=1, . . . , 2n, j=1, . . . , n are the parameters of the recurrent layer.

We set the number of iterations to $\tau$, which yields $d_i = \Sigma_{s=1}^\tau \lambda_s d_i^{(s)}$ as the final output of the recurrent layer, where $\lambda_s$ are learned weights. We initialize $\lambda_s$ as $0 < \lambda_1 < \ldots < \lambda_\tau$ and $\Sigma_{s=1}^\tau \lambda_s = 1$. The vector $\lambda = (\lambda_1, \ldots, \lambda_\tau)^T$ is then learned using backpropagation. By using the weighted sum of the output at each step rather than the output at the last step as final output of the recurrent layer, we can enforce intermediate supervision to make the recurrent layer gradually converge to the desirable output.

"Data Augmentation Approach"

In many applications, a number of available training samples (i.e., 2D and corresponding 3D landmark points) may be small. However, any regressor designed to learn a mapping function $f(\cdot)$ may require a large number of training samples with the 2D landmarks as seen from as many cameras and views (i.e., translation, rotation, scale) as possible to reach an acceptable performance level. The trade-off may be resolved with a seemingly simple, yet efficient data augmentation approach.

A key to our approach is to note that, for a given object, its 3D structure does not change. What changes are the 2D coordinates of the landmark points in an image of the given object. For example, scaling or rotating an object in 3D yields different 2D coordinates of the same object landmarks. Thus, our task is to generate as many of these possible sample views (of a given object) as possible.

We do this with a camera model. Herein as described, we use an affine camera model to generate a very large number of images of the known 3D sample objects. In other embodiments, a different camera model may be used. We model the intrinsic (e.g., focal length) as well as the extrinsic parameters (e.g., 3D translation, rotation and scale). A specific embodiment is the use of the weak-perspective camera model.

Another data augmentation concerns the modeling of imprecisely localized 2D landmark points. All detection algorithms yield imprecise detections (even when fiducial detections are done by humans). An embodiment of a deep neural network may address this problem by modeling the detection error as Gaussian noise, with zero mean and variance a. A particular embodiment may use a small variance equivalent to about 3% the size of the object. This means that, in addition to the 2D landmark points given by the camera models used above, a deep neural network will incorporate 2D landmark points that have been altered by adding this random Gaussian noise. This allows our neural network to learn to accurately recover the 3D shape of an object from imprecisely localized 2D landmark points.

It is important to note that, when the original training set is small, the deep neural network can still train efficiently using this method. In fact, we have found experimentally that we do not need a large number of training samples to obtain extremely low reconstruction errors. This is significant because deep neural nets most usually require very large training sets to learn to detect and recognize objects in images. Of course, even when the number of samples is large, our approach helps reduce the 3D reconstruction error by incorporating intrinsic and extrinsic camera parameters and detection errors which may not be well represented in the samples.

"Applied Noise and Missing Data to an Embodiment"

To determine how sensitive the proposed neural network is to inaccurate 2D landmark detections, we add independent random Gaussian noise with variance a to the elements in the databases as described in the preceding sections. That is, we add noise to the training samples. Specifically, we apply Gaussian noise to the 2D landmarks.

Performance degrades little as $\sigma$ increases when noise is added to the CMU Motion Capture database. The average height of subjects in this dataset is 1,500 mm, and the variance of the noise $\sigma$ added is about 3%. The proposed algorithm has been found to be robust to these inaccurate 2D landmark positions, with relative reconstruction error averaged across the testing subjects for each landmark with and without noise to be favorable. Results on publically available databases, for example, the BU-3DFE Face Database, FG3DCar Database and Flag Flapping in the Wind sequence have been obtained. The average width of the faces in BU-3DFE is 140 mm, hence, the variance of the detection error (noise) is 5%. The mean width of the car models in FG3DCar is 569 pixel, hence, the variance is 2%. The mean width of the flags is 386 mm, hence, the variance is 3%.

Additionally, we tested the ability of the trained system to deal with missing data. Here, each training and validation sample had one or more randomly selected landmark points missing during training and testing. Comparative results with different number of missing landmark points are in Table 1. Reference (1) is Zhou, Leonardos, Hu, and Daniilidis, "3d shape estimation from 2d landmarks: A convex relaxation approach," published in The IEEE Conference on Computer Vision and Pattern Recognition (CVPR), 2015. Reference (2) is Zhou, Zhu, Leonardos, Derpanis, and Daniilidis, "Sparseness meets deepness: 3d human pose estimation from monocular video," published in The IEEE Conference on Computer Vision and Pattern Recognition (CVPR), June 2016. Reference (3) is Ramakrishna, Kanade, and Sheikh, "Reconstructing 3d human pose from 2d image landmarks," published in ECCV, 2012, pp. 573-586. As can be seen in the table, our example deep neural network results achieve smaller reconstruction errors compared with Zhou's et al. even when our inputs had missing data and that of Zhou's et al. did not. We also compare our approach with a simple nearest neighbor approach. In the simple neighbor approach, for each testing sample, its 3D reconstruction is the 3D shape in the training set whose 2D projection has the smallest Euclidean distance with that of the test image.

Yin, Chen, Sun, Worm, and Reale in the article "A high-resolution 3d dynamic facial expression database" in Automatic Face & Gesture Recognition, 2008. FG'08. 8th IEEE International Conference On, IEEE (2008) 1-6; and BP4D-Spontaneous by Zhang, Yin, Cohn, Canavan, Reale, Horowitz, Liu, and Girard in the article "Bp4d-spontaneous: a high-resolution spontaneous 3d dynamic facial expression database" in Image and Vision Computing 32(10) (2014) 692-706; incorporated by reference herein in their entirety. Another dataset TimeSlice3D contains annotated 2D images that are extracted from online videos. Depth may be recovered using a model-based Structure from Motion technique. In total for this example, there are 18,694 training images. Each image has 66 labeled 3D fiducial points and a face bounding box centered around the mean 2D projection of the landmarks. 2D to 3D correspondence may presume a weak-perspective projection. The depth values have been normalized to have zero mean. Another 4,912 images are used for testing. In the example of the applied challenge 3DFAW, access was limited to the testing images and their bounding box for approaches, but access to 3D landmarks was not permitted.

Detection error may be evaluated using Ground Truth Error (GTE) and Cross View Ground Truth Consistency Error (CVGTCE). For example, evaluating error based on eye distance, GTE is the average point-to-point Euclidean error between prediction and ground truth normalized by the Euclidean distance between the outer corners of the eyes. Formally,

TABLE 1

| Method | Human 3.6M | CMU MoCap Subject 13 | CMU MoCap Subject 14 | CMU MoCap Subject 15 | BU-3DFE Face | FG3DCar | Flag Flapping |
|---|---|---|---|---|---|---|---|
| Disclosed Embodiment | 0.0120 | 0.0231 | 0.0200 | 0.0095 | 0.0032 | 0.0020 | 0.0004 |
| Disclosed Embodiment (with one missing) | 0.0314 | 0.0413 | 0.0396 | 0.0307 | 0.0035 | 0.0079 | 0.0038 |
| Disclosed Embodiment (with two missing) | 0.0383 | 0.0728 | 0.0694 | 0.0693 | 0.0037 | 0.0086 | 0.0054 |
| Nearest Neighbor (with one missing) | 0.0426 | 0.0983 | 0.0844 | 0.0497 | 0.0112 | 0.0129 | 0.0101 |
| Nearest Neighbor (with two missing) | 0.0428 | 0.0992 | 0.0859 | 0.0509 | 0.0106 | 0.0123 | 0.0101 |
| Zhou et al (1) | — | 0.0653 | 0.0643 | 0.0405 | 0.0053 | 0.0042 | — |
| Zhou et al (2) | 0.0359 | — | — | — | — | — | — |
| Ramakrishna et al (3) | — | 0.0983 | 0.0979 | 0.0675 | — | — | — |

Figure 4:
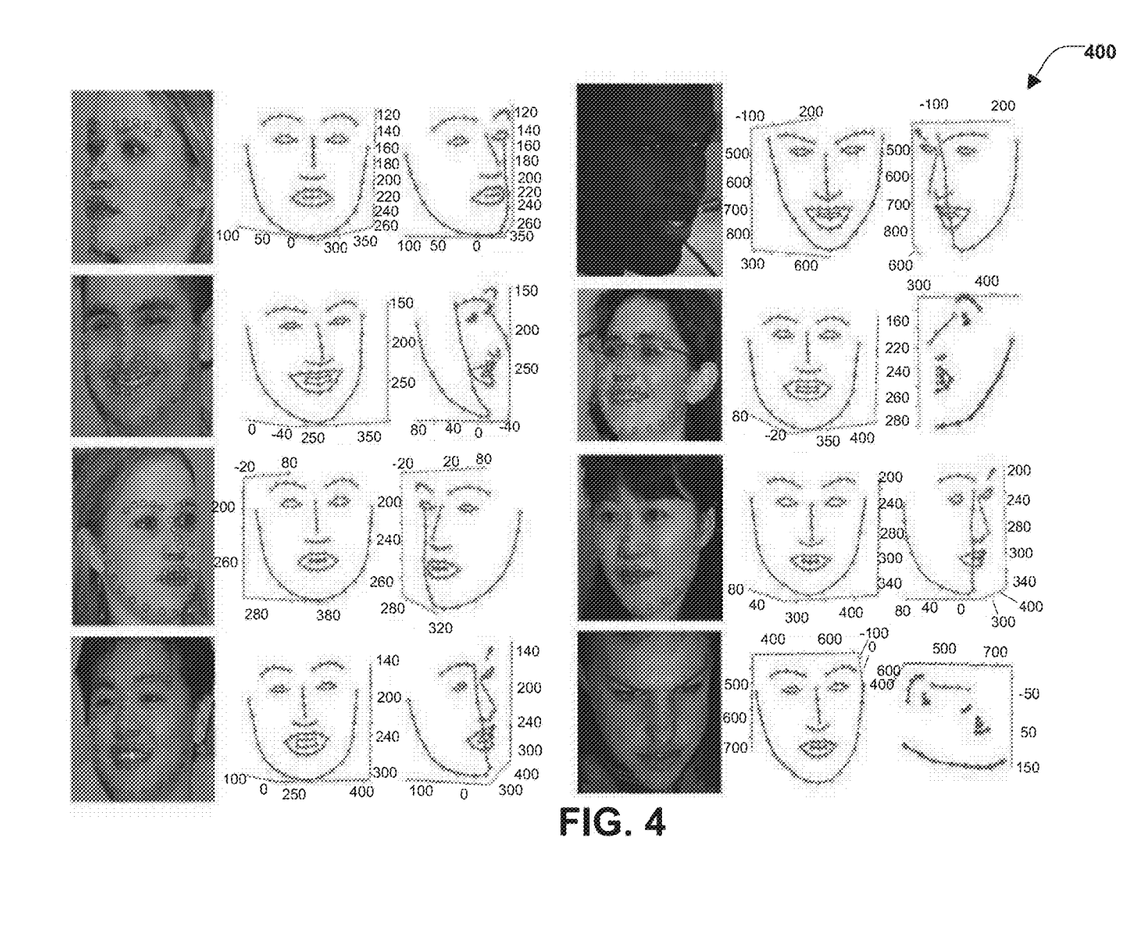
FIG. 4 presents example qualitative results in accordance with an aspect of the innovation.

FIG. 4 illustrates an example application of a deep neural network in accordance with an aspect of the innovation. The example displays qualitative testing results based on a challenge data set of a 3D Face Alignment in the Wild Challenge (3DFAW). The application precisely detects 3D landmarks of face with large head pose. Three of the four datasets in the challenge are subsets of publicly available databases, such as MultiPIE by Gross, Matthews, Cohn, Kanade, and Baker in the article "Multi-pie. Image and Vision Computing 28(5) (2010) 807-813"; BU-4DFE by $$E_{gte}(S, \tilde{S}) = \frac{1}{n}\sum_{k=1}^{n} \frac{\|s_k - \tilde{s}_k\|}{d}, \quad (13)$$

where $\|\cdot\|$ is the $L_2$-norm, S and $\tilde{S}$ are the 3D prediction and ground truth, $s_k$ and $\tilde{s}_k$ are the $k^{th}$ 3D point of S and $\tilde{S}$ respectively, and d is the Euclidean distance between the outer corners of the eyes.

CVGTCE is a measurement that evaluates cross-view consistency of the predicted landmarks by comparing the prediction and ground truth from a different view of the same target. Formally, $$E_{cvgtce}(S, \tilde{S}, P) = \frac{1}{n}\sum_{k=1}^{n} \frac{\|(cRs_k + t) - \tilde{s}_k\|}{d}, \quad (14)$$

where P={c, R, t} encodes a rigid transformation, i.e., scale (c), rotation (R), and translation (t) between S and $\tilde{S}$. These can be obtained by optimizing the following:

$$\{c,R,t\} = _{c,R,t}{}^{argmin}\Sigma_{k=1}{}^{n}\|\tilde{s}_k - (cRs_k+t)\|.$$

GTE and CVGTCE for testing images of the applied embodiment were 5.88% and 3.97%, respectively. FIG. 4 shows some qualitative results on the testing set of the challenge. Additionally, other tests on the training set of the challenge may be performed. For example, 13,694 images were randomly selected from training set to train the multi-layer neural network for 3D shape estimation from 2D landmarks. The other 5,000 images in the training set were tested with ground truth 2D face landmarks. The GTE was computed to be 2.00%. Comparison of our method with other top ranked methods on the 3DFAW challenge is shown in Table 2.

TABLE 2

Comparisons of the GTE and CVGTCE on 3DFAW challenge dataset.

| Participant | CVGTCE | GTE |
| --- | --- | --- |
| psxab5 | 3.4767 | 4.5623 |
| Disclosed Embodiment | 3.9700 | 5.8835 |
| rpiisl | 4.9488 | 6.2071 |
| trigeorgis | 5.4595 | 7.6403 |
| olgabellon | 5.9093 | 10.8001 |

In another aspect of the innovation, and to compare with the state-of-the-art methods, "across database" testing was performed, using the images of the BP4D-S database of Zhang, Yin, Cohn, Canavan, Reale, Horowitz, Liu, and Girard, discussed previously. An embodiment of the approach using the pre-trained model on the 3DFAW dataset of the previous section was tested. That is, no images or 3D data from BP4D-S were used as part of the training procedures, i.e., the experiment is across datasets. The procedure by Jourabloo and Liu in "Pose-invariant 3d face alignment" from The International Conference on Computer Vision (ICCV), (2015) was used to ensure a fair comparison. 100 images with yaw angle between 0° and 10°, 500 images with yaw angle between 10° and 20° and 500 other images with yaw angle between 20° and 30° were randomly selected for a total of 1,100 images. Since the landmarks in BP4D-S database are different from the challenge database, 45 overlapping landmarks were selected to test an embodiment of the innovative approach. The reported error in Jourabloo and Liu was calculated using the average of point-wise estimation error (APE) as follows:

$$E_{ape}(S, \tilde{S}) = \frac{1}{n}\sum_{k=1}^{n} \|s_k - \tilde{s}_k\| \quad (15)$$

Figure 5:
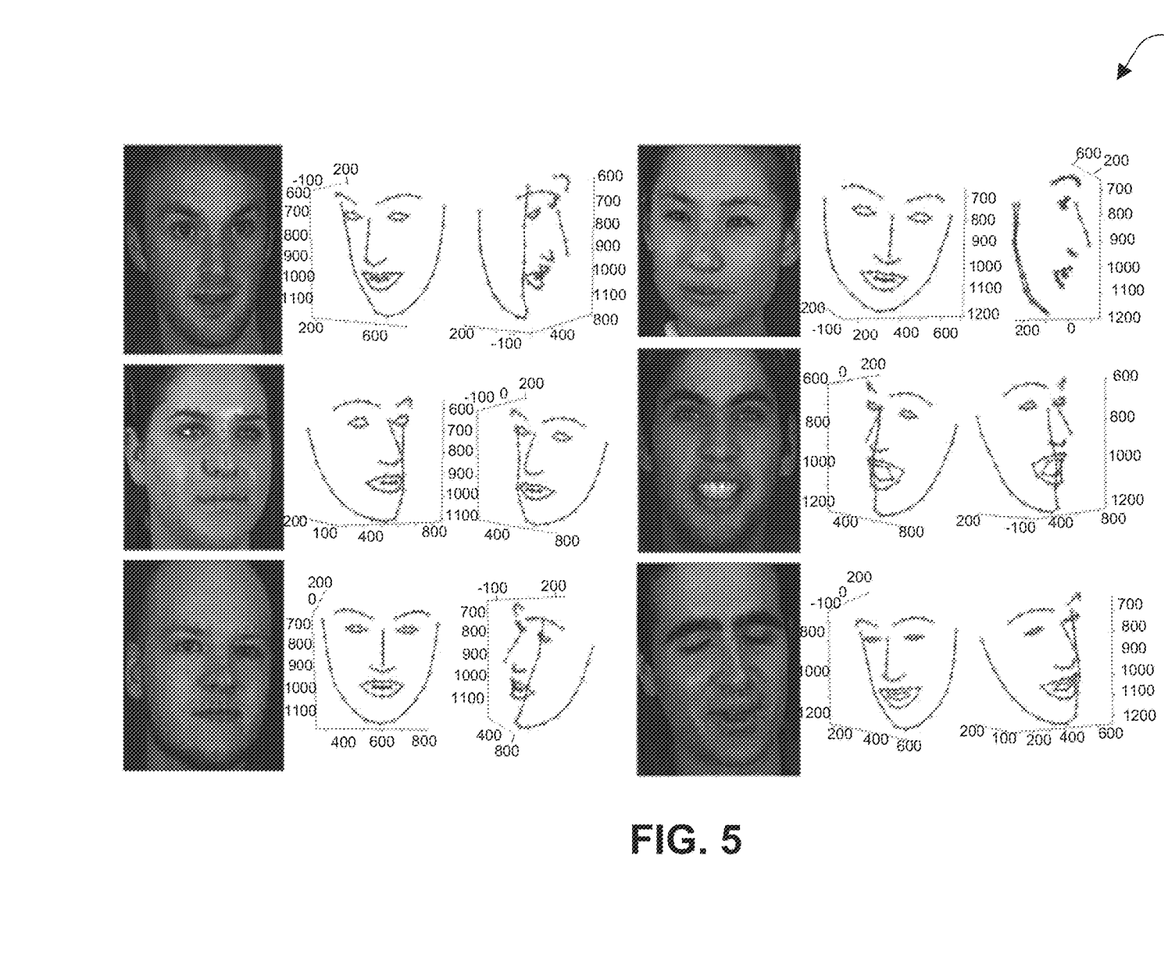
FIG. 5 presents example qualitative results in accordance with an aspect of the innovation.

As shown in Table 3, the embodiment of the approach described herein achieves the smallest APE compared with Jourabloo and Liu and the baseline (i.e., using the 3D mean face of the samples in Zhang, Yin, Cohn, Canavan, Reale, Horowitz, Liu, and Girard). FIG. 5 shows the qualitative results of the proposed approach on samples from BP4D-S.

TABLE 3

Comparisons of the APE on BP4D-S database.

| Disclosed Embodiment | PIFA Jourabloo and Liu | Baseline |
| --- | --- | --- |
| 4.14 | 4.75 | 5.02 |

The various tests confirm that embodiments of the innovative approach detect 3D landmarks of face with large head pose and facial expressions precisely.

Figure 6:
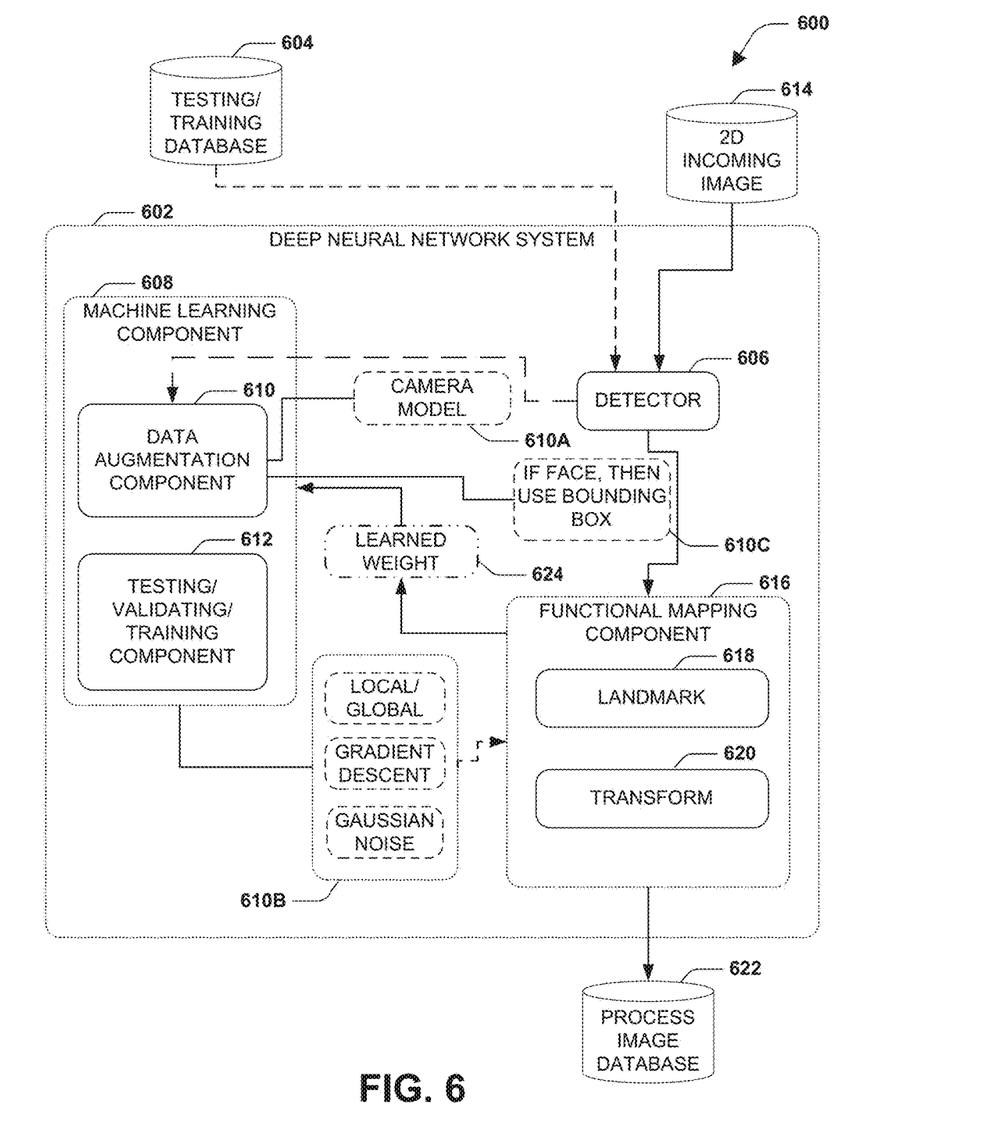
FIG. 6 presents an example system according to aspects of the innovation.

Turning now to FIG. 6, an example system 600 is presented in which many of the items from previously described embodiments may be viewed. It is to be appreciated that while in this example, image databases for testing/training images, non-sample 2D incoming images and processed images are shown in databases outside of the deep neural network system, in other embodiments, one or more of these databases may be included within a deep neural network system 602. For this embodiment, deep neural network system 602 may receive from an external testing/training database 604 a predetermined number of images. Detector 606 may receive the predetermined image set and provide them to a machine learning component 608. It is to be appreciated that according to augmentation previously discussed, a data augmentation component 610 may interact with the incoming predetermined image set and through camera model 610A augment the image set. It is also to be appreciated that the predetermined set, either augmented by camera model 610A or not, may be divided into subsets for the testing/validating/training component 612. The result of the machine learning component is that the deep neural network system 602 is trained. Further augmentations, as have been described previously, may be generated as shown in the group 610B (not separately labeled for clarity).

A trained deep neural network system 602 then may receive an incoming non-sample 2D image (here, pictured as from 2D incoming image 614) at detector 606. In one embodiment, if the incoming image is a face, then augmentation 610C may be applied. It is to be appreciated that augmentation 610C may also be applied to the predetermined image data set. Per discussion previously presented, functional mapping component 616 may use the optimized landmark and transform criterions in regressing 2D image characteristics to detect landmark points, in recovering depth information from image attributes and in mapping a yield of a 3D shape. Here, the yielded shape is shown as being exported to a process image database 622. It is to be appreciated that the yield may be used in other manners, including real time or near-real time display and use. It is to be appreciated that the system works for any type of objects other than faces too. Substituting the word face for any other object in the figure (e.g., car) yields an algorithm to recover the 3D shape of any object from a single 2D image.

It is to be further appreciated that the functional mapping component 616 can engage in a backpropagation manner by providing learned weights 624 back to the data augmentation component 610, as has been discussed in embodiments previously.

Figure 7:
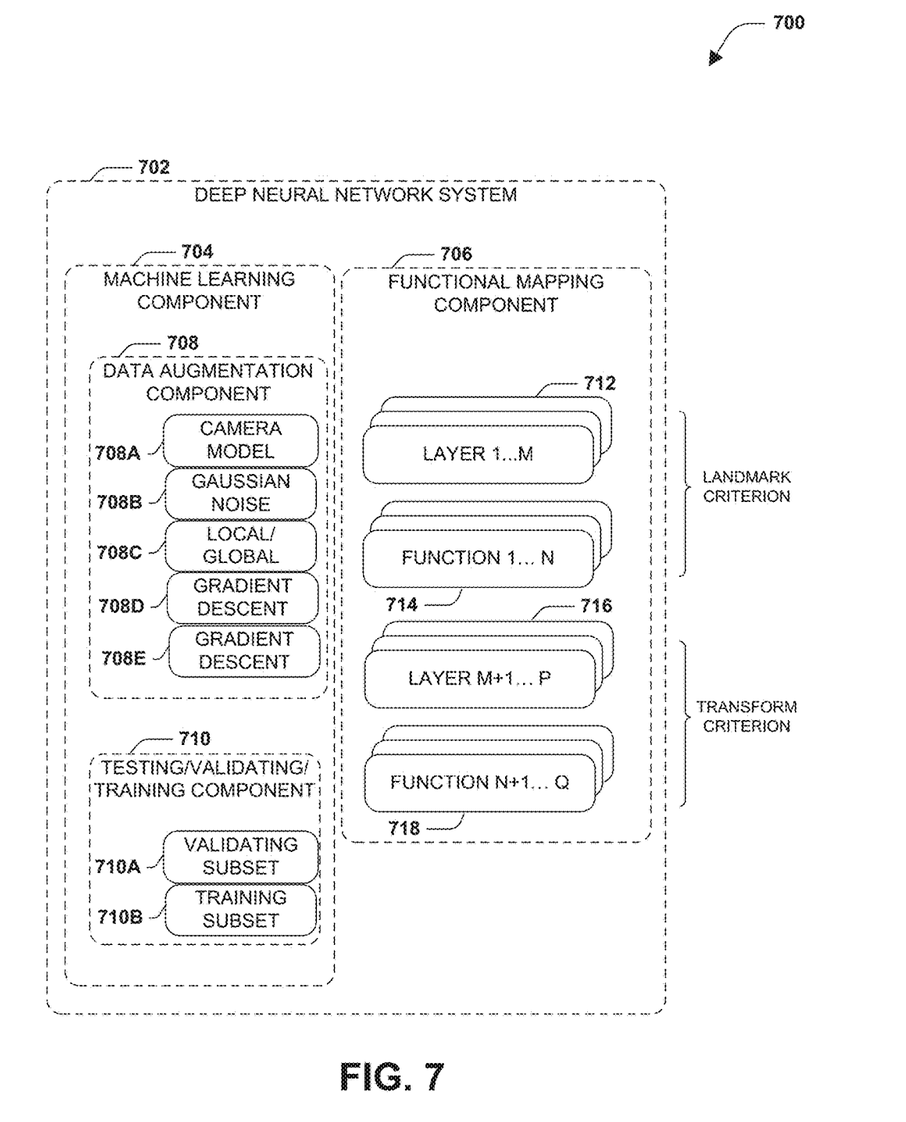
FIG. 7 presents an alternative view of an example system according to aspects of the innovation.

Turning to FIG. 7, an alternative view of an example system according to aspects of the innovation 700. In this view, deep neural network system 702 is depicted with a machine learning component 704 and a functional mapping component 706. Machine learning component 704 is shown as comprising at least a data augmentation component 708 and a testing/validating/training component 710. In this alternative view, possible subcomponents of each of the data augmentation component and the testing/validating/training components are depicted respectively as camera model 708A, Gaussian noise 708B, Local/global 708C, Gradient descent 708D, Learned weight 708E, validating subset 710A and training subset 710B.

Functional mapping component 706 is here pictured in an alternative view, in that the component may be comprised of multiple layers and functions. Here, layers 1 through M 712 and functions 1 through N 714 are shown as being associated with a landmark criterion and layers M+1 through P and functions N+1 through Q are shown as being associated with a transform criterion (M, N, P, and Q being integers). It is to be appreciated that the earlier discussions concerning layers and functions are intended to be reflected in this alternative portrayal.

Figure 8:
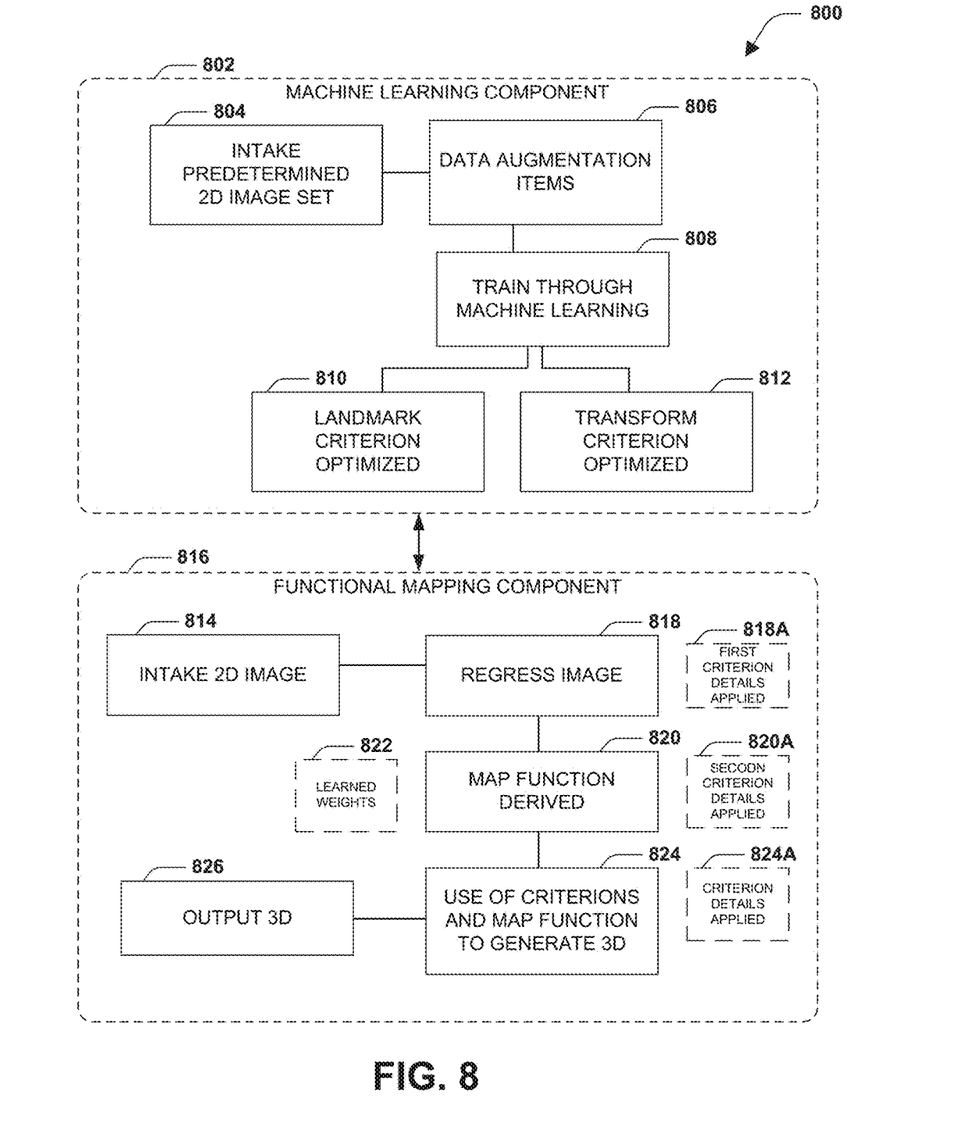
FIG. 8 illustrates an example method according to aspects of the innovation.

Turning now to FIG. 8, an example method according to aspects of the innovation is illustrated. It is to be appreciated that the example illustration 800 superimposes deep neural network components in dashed boxes around the portrayed method steps and that this is meant to reflect one possible embodiment. Other dashed boxes with squared corners are shown to reflect application and derivation of augmentation and criterions, and are also meant to reflect one possible embodiment. A machine learning component 802 may intake a predetermined 2D image set at 804. It is to be appreciated that not all components of a deep neural network may be shown, and this may be done strictly for clarity and not limitation. At step 806 the machine learning component applies data augmentation items (as for example discussed in other embodiments herein). At step 808, the machine learning component trains the deep neural network based at least in part on the predetermined 2D image set and data augmentation items. Flowing from this training, the landmark criterion is optimized 810 and the transform criterion is optimized 812. As the predetermined 2D image set largely allows the machine learning component to train the deep neural network, the deep neural network can intake a non-sample 2D image 814. It is to be appreciated that while this is portrayed in this embodiment as occurring within a functional mapping component 816, in other embodiments as previously discussed, the intake may occur with a component such as a detector (detector 606 of system 600, for example). The functional mapping component may regress the image at 818, applying first criterion details 818A. A map function 820 may be derived by functional mapping component 816, with second criterion details applied 820A. It is to be appreciated that during these steps a learned weight aspect 822 may be generated. Learned weight aspect 822 may then be back propagated to data augmentation items 806 to improve machine learning component 802. At 824, us of the criterions and the derived map function may map and generate a 3D shape related to the non-sample 2D image. 824A indicates the application of the criterions developed in the machine learning component 802. At 826, the 3D shape may be output. It is to be appreciated that the output may be used in many manners, including real time or near-real time display and use as well as storing in a process image database (not shown).

Example Computing Device

Figure 9:
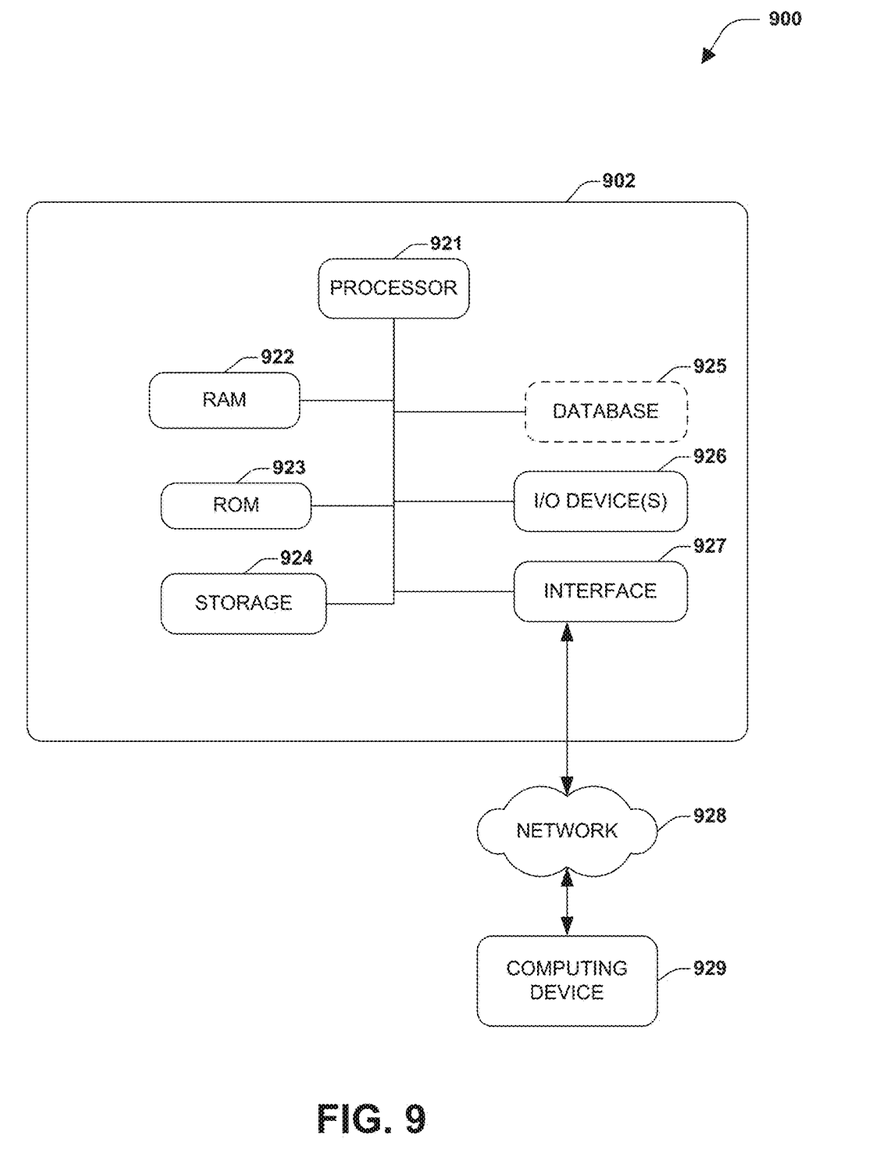
FIG. 9 presents an example computerized environment in which aspects of the innovation may be provided.

FIG. 9 illustrates an exemplary computer that can be used for configuring hardware devices in an industrial automation system. In various aspects, the computer of FIG. 9 may comprise all or a portion of the development workspace 902, as described herein. As used herein, "computer" may include a plurality of computers. The computers may include one or more hardware components such as, for example, a processor 921, a random access memory (RAM) module 922, a read-only memory (ROM) module 923, a storage 924, a database 925, one or more input/output (I/O) devices 926, and an interface 927. Alternatively and/or additionally, controller 920 may include one or more software components such as, for example, a computer-readable medium including computer executable instructions for performing a method associated with the exemplary embodiments. It is contemplated that one or more of the hardware components listed above may be implemented using software. For example, storage 924 may include a software partition associated with one or more other hardware components. It is understood that the components listed above are exemplary only and not intended to be limiting.

Processor 921 may include one or more processors, each configured to execute instructions and process data to perform one or more functions associated with a computer for indexing images. Processor 921 may be communicatively coupled to RAM 922, ROM 923, storage 924, database 925, I/O devices 926, and interface 927. Processor 921 may be configured to execute sequences of computer program instructions to perform various processes. The computer program instructions may be loaded into RAM 922 for execution by processor 921. As used herein, processor refers to a physical hardware device that executes encoded instructions for performing functions on inputs and creating outputs.

RAM 922 and ROM 923 may each include one or more devices for storing information associated with operation of processor 921. For example, ROM 923 may include a memory device configured to access and store information associated with controller 920, including information for identifying, initializing, and monitoring the operation of one or more components and subsystems. RAM 922 may include a memory device for storing data associated with one or more operations of processor 921. For example, ROM 923 may load instructions into RAM 922 for execution by processor 921.

Storage 924 may include any type of mass storage device configured to store information that processor 921 may need to perform processes consistent with the disclosed embodiments. For example, storage 924 may include one or more magnetic and/or optical disk devices, such as hard drives, CD-ROMs, DVD-ROMs, or any other type of mass media device.

Database 925 may include one or more software and/or hardware components that cooperate to store, organize, sort, filter, and/or arrange data used by controller 920 and/or processor 921. For example, database 925 may store hardware and/or software configuration data associated with input-output hardware devices and controllers, as described herein. It is contemplated that database 925 may store additional and/or different information than that listed above. It is to be appreciated that database 925 is portrayed in dashed lines. As discussed herein in relation to several embodiments, database 925 may be co-located within workspace 902, or similar to network 928 (i.e., the Internet) and computing device 929, may exist outside of workspace 902.

I/O devices 926 may include one or more components configured to communicate information with a user associated with controller 920. For example, I/O devices may include a console with an integrated keyboard and mouse to allow a user to maintain a database of images, update associations, and access digital content. I/O devices 926 may also include a display including a graphical user interface (GUI) for outputting information on a monitor. I/O devices 926 may also include peripheral devices such as, for example, a printer for printing information associated with controller 920, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 927 may include one or more components configured to transmit and receive data via a communication network, such as the Internet, a local area network, a workstation peer-to-peer network, a direct link network, a wireless network, or any other suitable communication platform. For example, interface 927 may include one or more modulators, demodulators, multiplexers, de-multiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification. Throughout this application, various publications may be referenced. The disclosures of these publications are incorporated by reference herein in their entirety into this application in order to more fully describe the state of the art to which the methods and systems pertain. It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method for mapping a computerized 2D image into a 3D shape comprising:
   applying machine learning to a predetermined sample size of computerized 2D images, that application developing two criteria, a detection criterion and a transform criterion for a multi-layer deep neural network ("DNN"),
   receiving a non-sample computerized 2D image through a detector of the DNN that has been trained by the application of machine learning,
   regressing, with the detection criterion, the non-sample image that yields detected landmark points through the DNN
   recovering, with the transform criterion, depth information from image attributes; and
   mapping, with the transform criterion, the landmark points through linear or nonlinear functions of the DNN that yield a 3D shape corresponding to the non-sample image.

2. The method of claim 1, wherein the application of machine learning comprises augmentation steps of at least one of camera model, bounding box, local/global, gradient descent and Gaussian noise in a feed-forward manner.

3. The method of claim 2, further comprising generating additional samples from the predetermined sample size by applying the data augmentation step of camera model that applies affine (or Euclidean or projective) transformations to the sample images of the predetermined sample size and training the detector with the additional samples.

4. The method of claim 2, wherein the non-sample image is a face and the augmentation step of bounding box centers and resizes the non-sample image for regressing and mapping by the DNN.

5. The method of claim 2, wherein the non-sample image is any rigid or non-rigid object and the augmentation step of bounding box centers and resizes the non-sample image for regressing and mapping by the DNN.

6. The method of claim 2, wherein the augmentation step of local/global increases accuracy of landmark detection by the detector and provides improved efficiency of machine learning.

7. The method of claim 6, wherein the application of local/global is based on at least one of pairs, triplets and complex quadrilaterals.

8. The method of claim 2, wherein the augmentation step of gradient descent is applied to the transform criterion.

9. The method of claim 2, wherein the augmentation of Gaussian noise compensates for detection errors, missing or occluded landmark points related to either sample or non-sample image(s), or both.

10. The method of claim 1, wherein the application of machine learning comprises an augmentation step of at least applying learned weights from a recurrent layer of the DNN in a back-propagation manner.

11. The method of claim 9, wherein the recurrent layer uses backpropagation to supply learned weights to the landmark criterion and enables intermediate supervision of the machine learning.

12. A Deep Neural Network (DNN) system for mapping a computerized 2D image into a 3D shape comprising:
    a machine learning component that receives a predetermined sample size of computerized 2D images and that develops a detection criterion and a transform criterion, a detector for receiving a non-sample computerized 2D image, the detector having been trained by the machine learning component; and a functional mapping component that regresses and detects, with the detection criterion, landmark points of the non-sample image, recovers, with the transform criterion, depth information from attributes of the non-sample image, and maps, with the transform criterion, the landmark points and the recovered depth information into a 3D shape that corresponds to the non-sample image.

13. The DNN system of claim 12, wherein the machine learning component provides augmentation steps of at least one of camera model, bounding box, local/global, gradient descent and Gaussian noise in a feed-forward manner.

14. The DNN system of claim 13, wherein the machine learning component further generates additional samples from the predetermined sample size by applying the augmentation step of camera model that applies affine transformations to the sample images of the predetermined sample size; and the detector is trained with the additional samples.

15. The DNN system of claim 13, wherein the non-sample image is a face and the bounding box augmentation centers and resizes the non-sample image for regressing and mapping by the DNN.

16. The DNN system of claim 13, wherein the non-sample image is any rigid or non-rigid object and the bounding box augmentation centers and resizes the non-sample image for regressing and mapping by the DNN.

17. The DNN system of claim 13, wherein the local/global augmentation increases accuracy of landmark detection by the detector and provides improved efficiency of machine learning.

18. The DNN system of claim 17, wherein the local/global augmentation is based on at least one of pairs, triplets and complex quadrilaterals.

19. The DNN system of claim 13, wherein the gradient descent augmentation is applied to the transform criterion.

20. The DNN system of claim 13, wherein the Gaussian noise augmentation compensates for detection errors, missing or occluded landmark points related to either sample or non-sample image(s), or both.

21. The DNN system of claim 12, wherein the application of machine learning comprises an augmentation step of at least applying learned weights from a recurrent layer of the DNN in a back-propagation manner.

22. The DNN system of claim 21, wherein the recurrent layer uses backpropagation to supply learned weights to the landmark criterion and enables intermediate supervision of the machine learning.

* * * * *